(12) United States Patent
Xu

(10) Patent No.: US 9,221,141 B1
(45) Date of Patent: Dec. 29, 2015

(54) TUNED MASS TOOL HOLDER

(71) Applicant: The Boeing Company, Chicago, IL (US)

(72) Inventor: Liangji Xu, Renton, WA (US)

(73) Assignee: The Boeing Company, Chicago, IL (US)

( * ) Notice: Subject to any disclaimer, the term of this patent is extended or adjusted under 35 U.S.C. 154(b) by 386 days.

(21) Appl. No.: 13/779,107

(22) Filed: Feb. 27, 2013

(51) Int. Cl.
*B23C 5/00* (2006.01)
*B23Q 11/00* (2006.01)
*B23B 27/00* (2006.01)
*B23B 29/02* (2006.01)

(52) U.S. Cl.
CPC ........... *B23Q 11/0035* (2013.01); *B23B 27/002* (2013.01); *B23B 29/022* (2013.01); *B23B 2250/04* (2013.01); *B23B 2250/16* (2013.01); *B23C 5/003* (2013.01)

(58) Field of Classification Search
CPC .... B23C 5/003; B23B 29/022; B23B 27/002; B23B 2250/04; B23B 2250/16; Y10T 409/304312; Y10T 408/76
USPC .......................................... 408/143; 409/141
See application file for complete search history.

(56) References Cited

U.S. PATENT DOCUMENTS

| | | | | |
|---|---|---|---|---|
| 3,938,626 A * | 2/1976 | Hopkins | ....................... | 188/378 |
| 5,074,723 A | 12/1991 | Massa et al. | | |
| 5,096,345 A * | 3/1992 | Toyomoto | ................ | 408/239 R |
| 5,125,777 A * | 6/1992 | Osawa | .......................... | 409/234 |
| 5,240,358 A * | 8/1993 | Hackett et al. | ................. | 409/141 |
| 5,263,995 A * | 11/1993 | Mogilnicki et al. | .......... | 409/131 |
| 5,810,527 A | 9/1998 | Jager et al. | | |
| 6,135,684 A * | 10/2000 | Senzaki | ......................... | 409/234 |
| 6,419,427 B1 * | 7/2002 | Galamba et al. | ............... | 409/131 |
| 6,471,453 B1 * | 10/2002 | Winebrenner et al. | ........ | 409/141 |
| 6,557,445 B1 * | 5/2003 | Ishikawa | .......................... | 82/158 |
| 6,810,733 B2 * | 11/2004 | Fischer | .......................... | 73/462 |
| 7,309,194 B2 * | 12/2007 | Keefe et al. | .................... | 408/1 R |
| 7,393,164 B2 | 7/2008 | Chen | | |
| 8,926,238 B1 * | 1/2015 | Bolin et al. | ..................... | 409/132 |
| 2001/0048856 A1 * | 12/2001 | Dyer et al. | ..................... | 409/131 |
| 2004/0115017 A1 * | 6/2004 | Trionfetti | ....................... | 409/141 |
| 2005/0179178 A1 * | 8/2005 | Cropelli | ......................... | 267/137 |
| 2007/0226985 A1 * | 10/2007 | Paton et al. | ................. | 29/525.01 |

(Continued)

FOREIGN PATENT DOCUMENTS

DE 273992 A * 12/1989 ................ B23C 5/10
DE 102009009212 B3 * 6/2010 ............ B23Q 11/00

(Continued)

OTHER PUBLICATIONS

S. Smith and J. Tlusty, Stabilizing Chatter by Automatic Spindle Speed Regulation, Annals of the CIRP, vol. 41/1/1992.

(Continued)

*Primary Examiner* — Sunil K Singh
*Assistant Examiner* — Ryan Rufo
(74) *Attorney, Agent, or Firm* — Joseph M. Rolnicki; Evans & Dixon, L.L.C.

(57) ABSTRACT

A tuned mass tool holder having an axis of rotation has a mass that can be varied. The distribution of the tool holder mass can be adjusted along the axis of rotation, the center of gravity of the tool holder can be moved along the axis of rotation, and the moment of inertia of the tool holder can be changed relative to the holder-spindle interface.

20 Claims, 7 Drawing Sheets

(56) References Cited

U.S. PATENT DOCUMENTS

| | | | |
|---|---|---|---|
| 2008/0080942 A1* | 4/2008 | Chen | 409/141 |
| 2008/0226401 A1* | 9/2008 | Hoefler et al. | 407/34 |
| 2008/0302181 A1* | 12/2008 | Haimer | 73/468 |
| 2012/0003055 A1* | 1/2012 | Sasaki et al. | 408/143 |
| 2012/0082520 A1* | 4/2012 | Yeh et al. | 407/67 |
| 2012/0099940 A1* | 4/2012 | de Souza Filho | 409/131 |

FOREIGN PATENT DOCUMENTS

| | | | | | |
|---|---|---|---|---|---|
| JP | 2000-042857 A | * | 2/2000 | | B23Q 11/00 |
| JP | 2001-246530 A | * | 9/2001 | | B23Q 11/00 |
| JP | 2002-137133 A | * | 5/2002 | | B23Q 3/12 |
| JP | 2004-009244 A | * | 1/2004 | | B23Q 3/12 |
| JP | 2005-118929 A | * | 5/2005 | | B23B 29/02 |
| JP | 2005-329509 A | * | 12/2005 | | B23B 29/02 |
| JP | 2012-139809 A | * | 7/2012 | | B23Q 3/12 |

OTHER PUBLICATIONS

T.L. Schmitz, Predicting High-Speed Machining Dynamics by Substructure Analysis, National Institute of Standards and Technology, Automated Technology Division, Gaithersburg, USA Submitted by R.R. Donalson, Pleasanton, USA, Received Jan. 4, 2000 Annals of the CIRP vol. 49/1/2000.

* cited by examiner

TUNED MASS TOOL HOLDER

BACKGROUND

Machining, e.g., milling operations are often accompanied by vibration that occurs during the interaction of a cutting tool with a workpiece. This vibration is often referred to as self-excited vibration, regeneration vibration, or chatter. Chatter is an unstable condition occurring, primarily, in high-speed machining operations and may result in undesirable surface defects requiring substantial post-processing to eliminate. In extreme cases, the machined surface may be damaged beyond repair, rendering the workpiece unusable. Due to its regenerative nature, chatter may become sufficiently violent to damage the cutter and even the machine tool itself.

One method commonly employed to mitigate regenerative vibration or chatter includes reducing the depth of cut. However, this technique is associated with a reduction in material-removal rate and decreased productivity. Adjusting the rotational speed of the spindle to match the "cutting" frequency (related to the number of times the teeth of the cutter contact the workpiece in a given time period), or its harmonics, with the natural frequency of the system is another option available in controlling chatter. However, the spindle speed optimal for a particular cutting tool, tool holder, and spindle combination may be unavailable on a given machine tool, may be unsuitable for the cutter, or may result in lower production rates. Another approach used in reducing chatter is adjusting the length or "stick-out" of the cutting tool to change the system's natural frequency. However, this method has limited effect, since the range of "stick-out" adjustment is restricted. Specialized cutting tools have also been developed to abate chatter in various machining applications, but the higher cost of such tools has been a disadvantage.

SUMMARY

The problem of regenerative vibration or chatter between the workpiece and a cutting tool is reduced or eliminated by the tuned mass tool holder of the invention and its method of use.

The tuned mass tool holder includes a holder body and a plurality of weight members that are removably attachable to the holder body.

The holder body has an elongate length with opposite proximal and distal ends. The body has a generally cylindrical configuration and is symmetric around a center rotation axis of the body.

A spindle surface is provided on the holder body adjacent the holder body proximal end. The spindle surface is configured to be attached to a spindle of a cutting machine. When the spindle surface is attached to a machine spindle, the rotation of the spindle rotates the holder body about its axis of rotation.

A weight member surface is provided on the holder body adjacent the holder body distal end. The weight member surface is a cylindrical exterior surface having a substantially constant exterior diameter dimension along the entire axial length of the weight member surface. The axial length of the weight member surface is divided into a plurality weight member locations each having a same axial length.

The plurality of weight members are each removably attachable to the weight member surface of the holder body. Each weight member has an annular configuration with a cylindrical interior surface, an axis of rotation and an exterior surface symmetrical to the axis of rotation. The cylindrical interior surfaces of the weight members each have an interior diameter dimension that enables the weight members to fit in sliding engagement over the holder body weight member surface. This also enables each weight member to be positioned at each of the plurality of separate, distinct weight member locations on the holder body weight member surface. Some of the weight members may have a same exterior diameter dimension. These weight members have substantially the same mass, the same center of gravity along their axis of rotation and a same moment of inertia relative to the holder-spindle interface. Additionally, some of the weight members may have exterior diameter dimensions that are different from the exterior diameter dimensions of other weight members. Each of the weight members has a same axial length dimension that enables each weight member to fit over each weight member location on the holder body weight member surface.

According to the method of the disclosure, by selectively choosing a particular size and number of weight members from the plurality of weight members, and positioning the chosen weight member(s) at different weight member location(s) on the weight member surface of the holder body, the mass of the holder body can be varied, the mass distribution of the holder body along the axis of rotation can be adjusted, the center of gravity of the holder body can be moved along the axis of rotation, and the moment of inertia of the holder body to the holder-spindle interface can be changed.

Thus, when performing a machining operation with a cutting tool mounted to the tuned mass tool holder according to one or more aspects of the disclosure, if an unstable cutting condition is detected, the tool holder can be reconfigured to change at least one of the mass of tool holder, the mass distribution of the tool holder, the center of gravity of the tool holder and/or the moment of inertia of the tool holder.

The features, functions, and advantages that have been discussed can be achieved independently in various aspects of the disclosure or may be combined in yet other aspects, further details of which can be seen with reference to the following description and drawings.

BRIEF DESCRIPTION OF THE DRAWING FIGURES

DESCRIPTION

Figure 1:
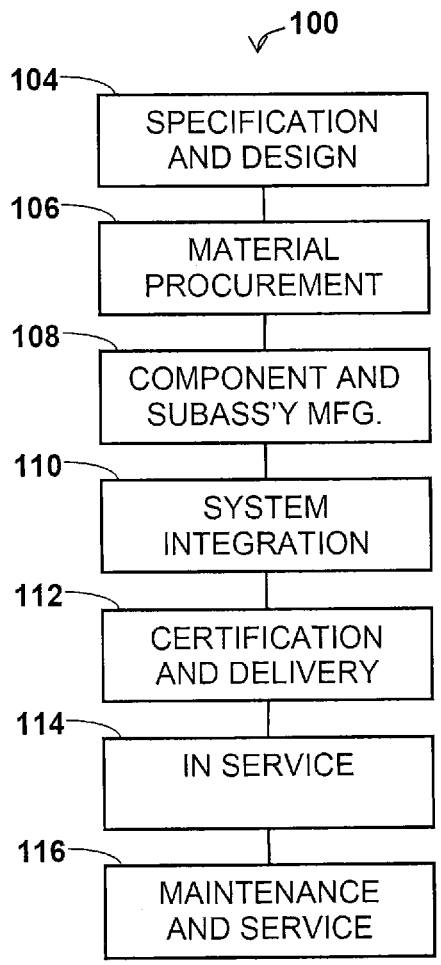
FIG. 1 is a flow diagram of the aircraft production and service methodology.
Figure 2:
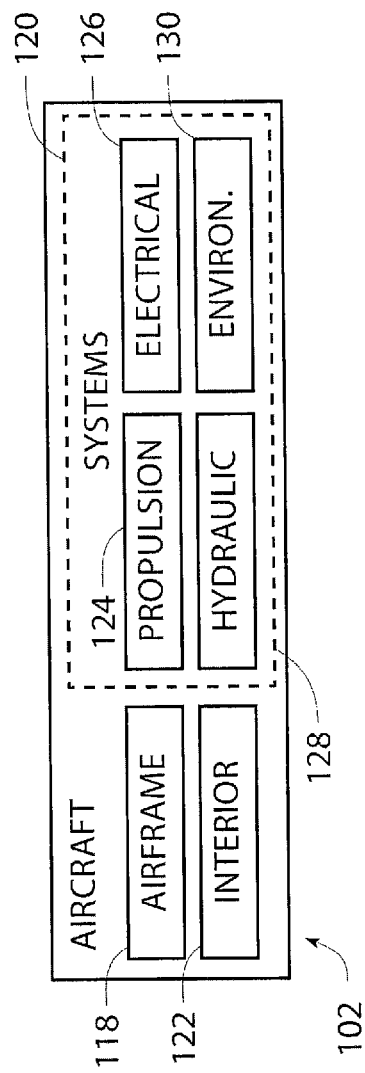
FIG. 2 is a block diagram of an aircraft.

Referring more particularly to the drawings, the various aspects of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
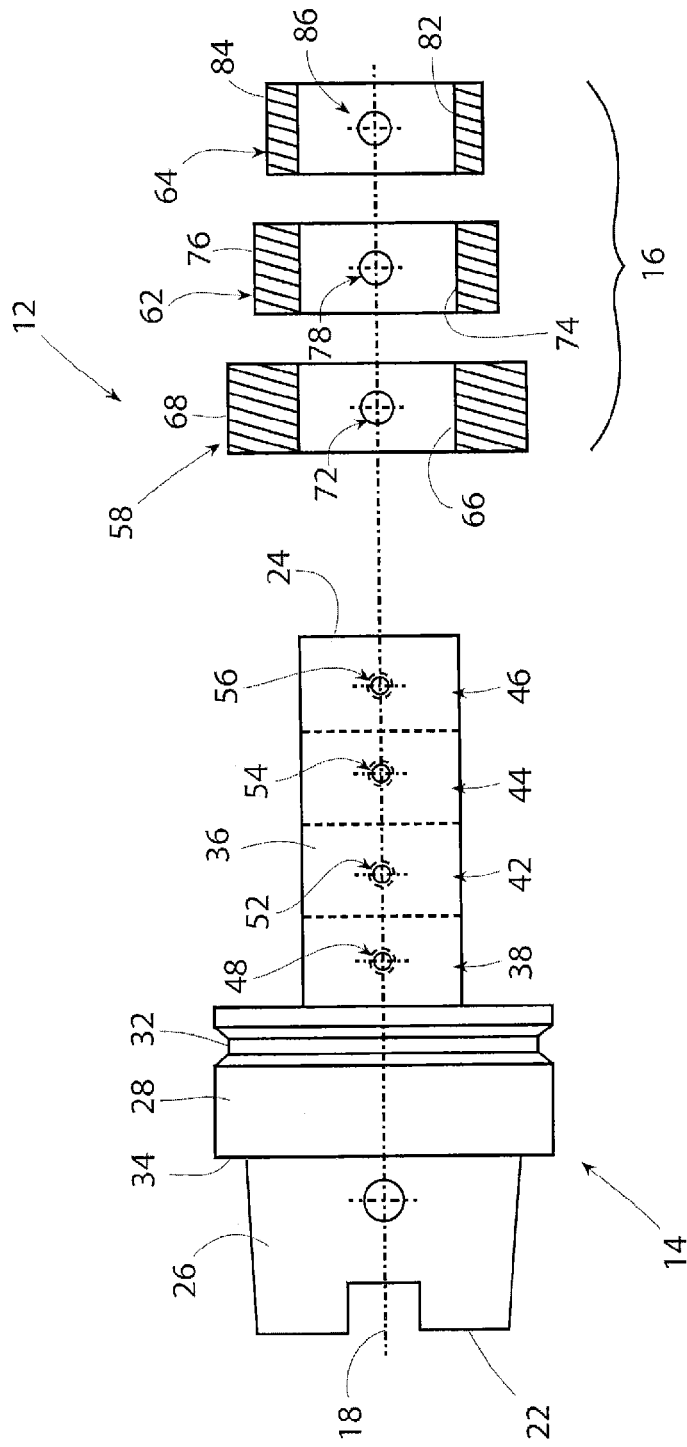
FIG. 3 is a representation of a side view of the component parts of the tuned mass tool holder of the disclosure.

FIG. 3 is a representation of a side view of the component parts of the tuned mass tool holder 12 of the disclosure. The tool holder 12 includes a holder body 14 and a plurality of mass rings or weight members 16. The component parts are constructed of metal to provide the tool holder 12 with sufficient strength for its intended purpose. However, other equivalent materials could be employed in constructing the component parts.

The holder body 14 has a general cylindrical configuration that is symmetric around a center axis of rotation 18 of the holder body. The holder body 14 has an elongate axial length between a proximal end 22 and a distal end 24 of the holder body.

A spindle surface 26 is formed on the holder body 14 adjacent the holder body proximal end 22. The spindle surface 26 is configured to be attachable to a conventional spindle of a rotary cutting machine (not shown). With the spindle surface 26 attached to the cutting machine spindle, rotation of the spindle rotates the holder body 14 about its center axis 18.

A cylindrical flange 28 and a v-notch flange 32 are formed on an intermediate portion of the holder body 18. The exterior surfaces of the two flanges 28, 32 are coaxial with the center axis of rotation 18 of the holder body 14. An annular end surface 34 of the cylindrical flange 28 is abutted against the cutting machine's spindle (not shown) when attaching the holder body 14 to the spindle to ensure that the holder body center axis of rotation 18 is coaxial with the spindle axis of rotation.

A cylindrical weight member surface 36 extends axially from the v-notch flange 32 to the holder body distal end 24. The weight member surface 36 is coaxial with the holder body center axis of rotation 18 and has a diameter dimension that is constant along the entire axial length of the weight member surface. In other examples of the holder or body 14, the weight member surface 36 could have different exterior diameter dimensions at different locations along its axial length. The weight member surface 36 is axially divided into a plurality weight member locations 38, 42, 44, 46, which, in one example, may be separate and distinct. In the illustrated example of the holder body 14 shown in FIG. 3, the weight member surface 36 is divided into four weight member locations 38, 42, 44, 46. In other examples of the holder body 14 the number of weight member locations could be less than four, or more than four. Weight member locations 38, 42, 44, 46 may have axial length dimensions. However, in other examples, the axial length dimensions of the weight member locations 38, 42, 44, and 46 may be different. Each of the weight member locations 38, 42, 44, 46 may also have at least one opening, such as a threaded screw hole 48, 52, 54, 56. In one example, the screw hole 48, 52, 54, 56 may be centered relative to its respective weight member location 38, 42, 44, 46 and may constitute a blind hole. In another example, the opening or openings may be through or blind and may have smooth walls (without threads) for receiving a fastener of fasteners other than screws, such as interference-type fasteners. In some cases, such as when the set screws are utilized, the use of the openings in the weight member surface 36 may not be necessary. In the illustrated example of the holder body 14 shown in FIG. 3, the screw holes 48, 52, 54, 56 are axially aligned along the weight member surface 36. In other examples, the screw holes 48, 52, 54, 56 could be circumferentially spaced around the weight member surface 36 in any number of symmetric patterns.

In the illustrated example of the tuned mass tool holder 12 shown in FIG. 3, the plurality of weight members 16 includes three weight members 58, 62, 64 of different sizes and/or weights. In other examples of the tuned mass tool holder the number of weight members could be more than three or fewer than three. Additionally, there could be more than one weight member of any one particular size and/or weight or all the weight members may have the same size and/or weight.

The first weight member 58 is shown in cross section in FIG. 3 and has an annular configuration with a cylindrical interior surface 66 and a cylindrical exterior surface 68. The diameter of the interior surface 66 is selected to permit the first weight member 58 to be removably attached to the weight member surface 36 of the holder body with a sliding (push) fit (snug sliding engagement). In one example, the interior surface 66 and exterior surface 68 have substantially the same axial length (i.e., dimensions along the center axis 18) that are also substantially the same as the axial length dimensions of the weight member locations 38, 42, 44, 46 on the weight member surface 36. In another example, the axial length dimensions of two or more weight member locations 38, 42, 44, 46 may be different and the axial length dimension of the interior surface 66 may also differ from those of the exterior surface 68, with the interior surface 66 engaging one or more weight member locations 38, 43, 44, 46, corresponding thereto, with a sliding fit. The above-mentioned variations in axial dimensions, as well as other dimensional and/or mass variations of the different elements of the tool holder 12 described herein, may enhance the fine-tuning potential of the tool holder 12 for purposes of mitigating chatter. The first member 58 includes at least one hole 72, which may, in one example, be centered relative to the axial length of the first weight member 58 and may be unthreaded. In one example, the hole 72 extends completely through the wall of the weight member and is dimensioned to receive a screw (not shown) with a clearance fit. The screw (not shown) is dimensioned to thread into any one of the screw holes 48, 52, 54, 56 associated with the respective weight member locations 38, 42, 44, 46 and thereby secure the first weight member 58 at that weight member location. In another example, an interference-type fastener (not shown) may be used for attaching weight member 58 to weight-member surface 36. Alternatively, a set screw (not shown), in conjunction with the hole 72, threaded to mate with the set screw, may be used to secure the first weight member 58 to the respective weight member location 38, 42, 44, 46 having a blind unthreaded opening or another surface for receiving the set screw.

The second weight member 62, like the first weight member 58 is shown in cross-section in FIG. 3 and has an annular configuration. The second weight member 62 also has a cylindrical interior surface 74 and a cylindrical exterior surface 76. The cylindrical interior surface 74 has a diameter that is substantially the same as that of the first weight member 58 and is selected to permit the second weight member 62 to be removably attached to the holder body weight member surface 36 with a sliding (push) fit (a snug sliding engagement). The axial length dimension of the second weight member interior surface 74 is also substantially the same as those of the first weight member 58. This also enables the second weight member 62 to occupy any one of the weight member locations 38, 42, 44, 46 on the weight member surface 36. Alternatively, the axial length dimensions of the first weight member 58 and the second weight member 62 may be different. The second weight member exterior surface 76 however has a different, smaller exterior diameter dimension than the first weight member 58. With the second weight member 62 having a smaller exterior diameter dimension than that of the first weight member 58, the second weight member 62 also has a smaller mass and that of the first weight member 58, and will also have a smaller moment of inertia than the first weight member 58. The second weight member 62 is also provided with a hole 78 that is centered in the axial length dimension of the weight member and may be unthreaded. As with the first weight member 58, the hole 78 extends through the weight member and is dimensioned to receive, with a clearance fit, a screw (not shown) that is threaded into any one of the screw holes 48, 52, 54, 56 associated with the respective weight member locations 38, 42, 44, 46 to secure the second weight member 62 at that location on the weight member surface 36. Alternatively, the second weight member 62 may be configured and attached to the surface 36 in substantially the same manner as otherwise described above with reference to the first weight member 58.

Like the first 58 and second 62 weight members, the third weight member 64 is shown in cross-section and also has an annular configuration. The third weight member 64 has a cylindrical interior surface 82 and a cylindrical exterior surface 84. The diameter of the interior surface 82 is selected to permit the third weight member 64 to be removably attached to the holder body weight member surface 36 with a sliding (push) fit, (a snug sliding engagement). The axial length dimension of the interior surface 82 is also substantially the same as those of the first weight member 58 and second weight member 62. This enables the third weight member 64 to occupy any of the weight member locations 38, 42, 44, 46 on the weight member surface 36. Alternatively, the axial length dimensions of at least two of the first weight member 58, the second weight member 62, and the third weight member 64 may be different. The third weight member exterior surface 84 has a diameter dimension that is smaller than those of the first weight member 58 and second weight member 62. With the third weight member having a smaller exterior diameter dimension than the first weight member 58 and second weight member 62, the third weight member 64 also has a smaller mass and a smaller moment of inertia than the first weight member 58 and the second weight member 62. As with the first 58 and second 62 weight members, the third weight member 64 also has a hole 86 that is axially centered in the weight member and may be unthreaded. The hole 86 extends through the weight member and is dimensioned to receive, with a clearance fit, a screw (not shown) inserted through the hole and threaded into any one of the screw holes 48, 52, 54, 56 associated with the respective weight member locations 38, 42, 44, 46 on the weight member surface 36 to secure the third weight member 64 at that location. Alternatively, the third weight member 64 may be configured and attached to the surface 36 in substantially the same manner as otherwise described above with reference to the first weight member 58.

By selectively choosing one or more of the weight members 58, 62, 64 and positioning and securing the chosen weight members at different weight member locations 38, 42, 44, 46 on the weight member surface 36, the mass of the holder body 18 can be varied, the mass distribution of the holder body 14 along the center axis of rotation 18 can be adjusted, the center of gravity of the holder body 14 can be moved along the axis of rotation 18, and the moment of inertia of the holder body 14 to the holder-spindle interface can be changed.

Figure 4:
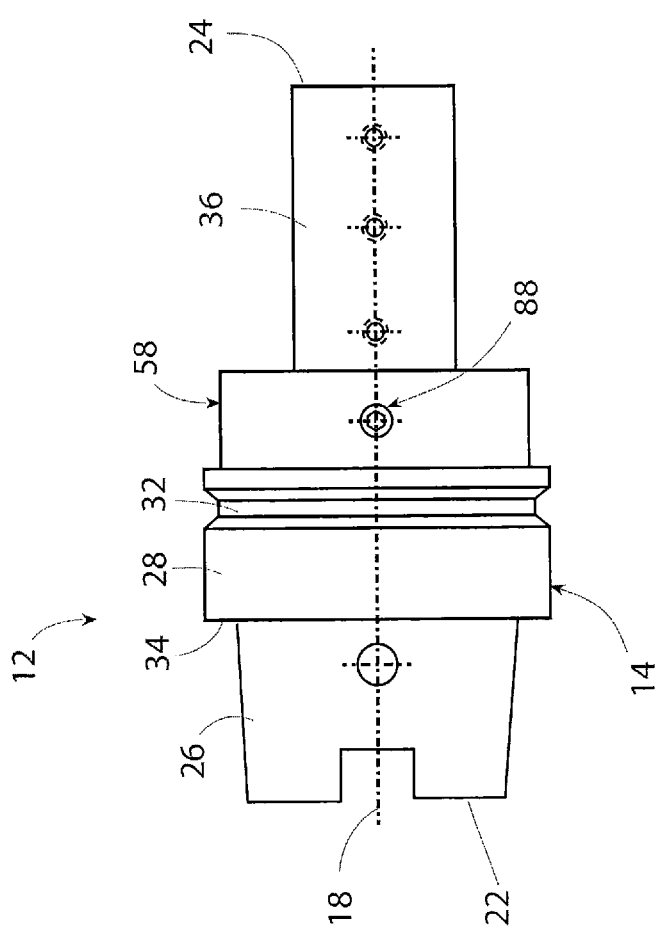
FIG. 4 is a representation of a side view of one configuration of the tuned mass tool holder.

For example, FIG. 4 is a representation of the holder body 14 having one of the first weight members 58 secured to the weight member location 38 on the weight member surface 36 by a screw 88.

Figure 5:
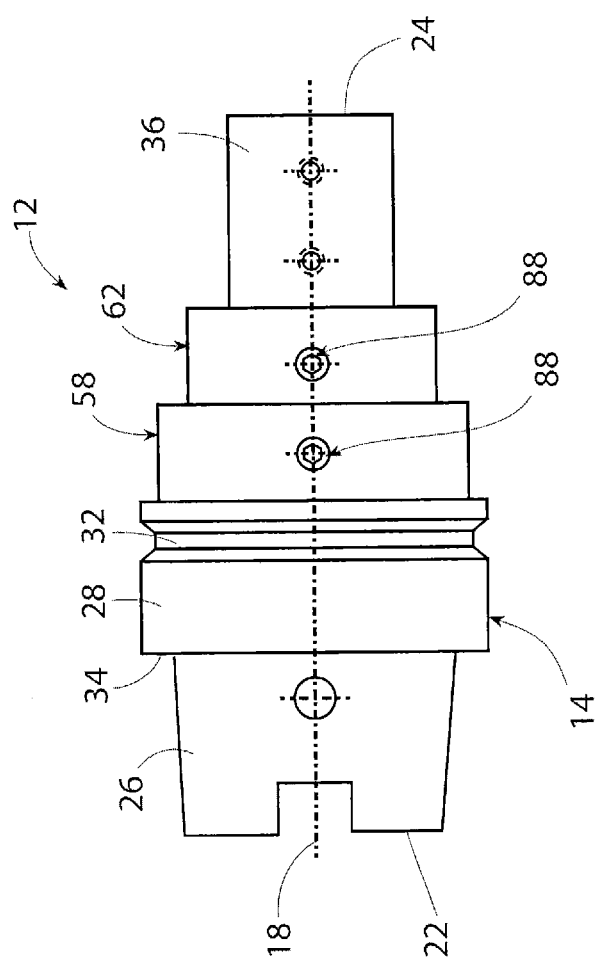
FIG. 5 is a representation of a side view of a further configuration of the tuned mass tool holder.

FIG. 5 shows a further example of securing the first weight member 58 and the second weight member 62 at weight member locations 38, 42 on the weight member surface 36 by screws 88.

Figure 6:
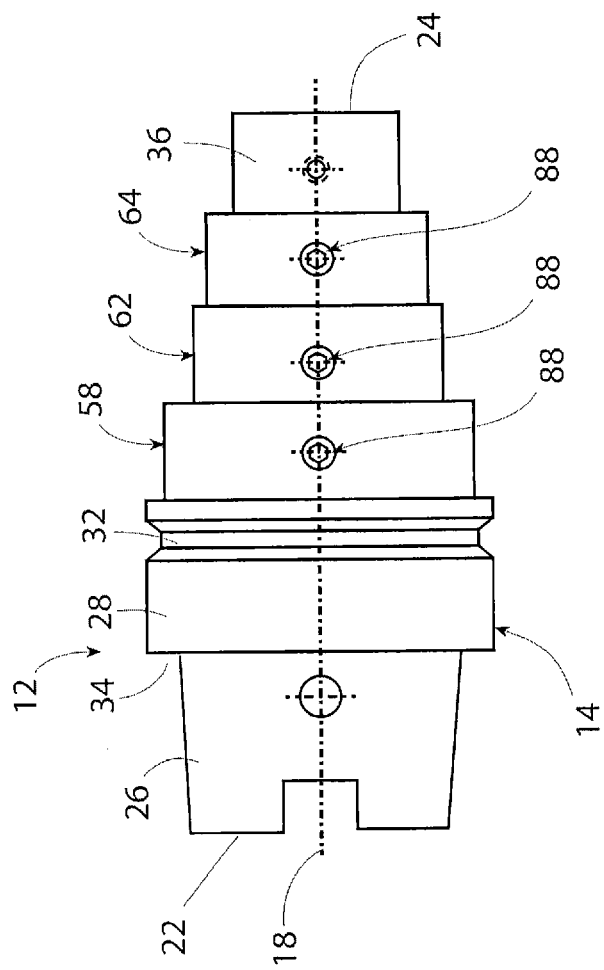
FIG. 6 is a representation of a side view of a further configuration of the tuned mass tool holder.

FIG. 6 represents a further example of the first 58, second 62 and third 64 weight members secured at weight member locations 38, 42, 44 on the weight member surface 36 by screws 88.

Figure 7:
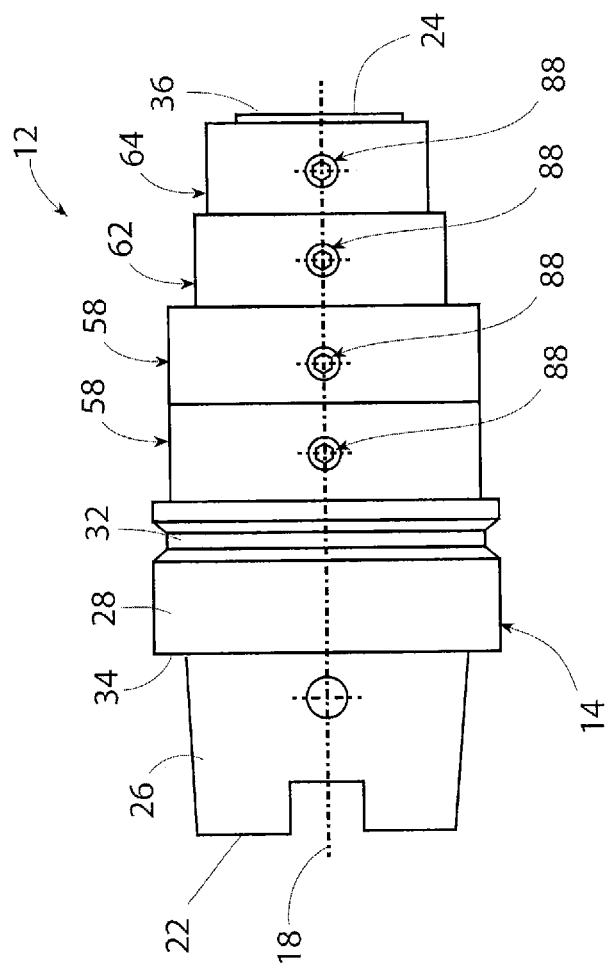
FIG. 7 is a representation of a side view of a further configuration of the tuned mass tool holder.

FIG. 7 represents an example where two of the first weight members 58, a second weight member 62, and a third weight member 64 are secured at the weight member locations 38, 42, 44, 46 on the weight member surface 36 by screws 88.

FIGS. 4-7 represent how the tuned mass tool holder 12 can be configured with different combinations of the weight members 58, 62, 64 to change at least one of the mass of the tool holder 14, the mass distribution along the axis of rotation 18 of the tool holder, the center of gravity along the axis of rotation 18 of the tool holder 14 and the moment of the inertia of the tool holder 14.

One or more aspects of the disclosure relate to altering the system's natural frequency by changing the mass of the tool holder and the mass distribution along the tool holder. Increasing the mass of the tool holder decreases the natural frequency of the system. Decreasing the mass of the tool holder increases the natural frequency of the system. Additionally, moving the mass closer to the spindle increases the natural frequency of the system, and moving the mass away from the spindle decreases the natural frequency of the system.

A method of tuning the tool holder 12 for a high speed rotational processing or machining of a workpiece is disclosed herein. With a cutting tool held by the tool holder 12 being rotated about the axis of rotation 18 of the tool holder in a high-speed rotational processing operation having a dynamic characteristic associated therewith, the operation is first detected to be stable or unstable. If detected to be unstable, the high-speed rotational processing operation is terminated. For example, if an unstable vibration is detected to exist in the rotating tool holder 12 and cutting tool, the machining of the workpiece is terminated.

The tool holder 12 is then reconfigured by at least one of: varying the mass of the tool holder with one or more of the weight members 58, 62, 64 being added to the tool holder, adjusting the mass distribution of the tool holder 12 relative to the axis of rotation 18 by positioning one or more selected weight members 58, 62, 64 at one or more corresponding weight member locations 38, 42, 44, 46 on the tool holder, moving the center of gravity of the tool holder 12 along the axis of rotation 18 by adding at least one of the weight members 58, 62, 64 at one or more of the weight member locations 38, 42, 44, 46 on the tool holder, and changing the moment of inertia of the tool holder 12 relative to the holder-spindle interface by the addition of at least one of the weight numbers 58, 62, 64 at one or more of the weight member locations 38, 42, 44, 46 on the tool holder. The high-speed rotational processing or machining operation on the workpiece using the tool held by the tool holder 12 is then again commenced. The operation is once again detected to be stable or unstable. If the operation is stable, the tool holder 12 is identified as having been tuned for the high-speed rotational processing of the workpiece with the tool. If the operation is again detected to be unstable, the reconfiguring of the tool holder is repeated, as described above.

Alternatively, the dynamic characteristics of the tool, holder and the spindle can be measured and the required weight members and their locations can be calculated for a stable rotational processing operation. The desired weight members then are installed at the calculated locations on the holder. The rotational processing operation then starts with the correctly installed holder.

As various modifications could be made in the construction of the apparatus herein described and illustrated and its method of use without departing from the scope of the disclosure, it is intended that all matter contained in the foregoing description and shown in the accompanying drawings shall be interpreted as illustrative rather than limiting. For example, the weight members 58, 62, 64 could be threaded onto the weight member surface 36 and held at a weight member location 38, 42, 44, 46 by a lock nut or other equivalent device. Additionally, the weight member locations 38, 42, 44, 46 could be threaded and stepped and the weight members 58, 62, 64 could be provided with different size internally threaded bores that are threaded onto the different stepped weight member locations and tightened against the side of an adjacent larger step to secure the weight members and their locations. Furthermore, adjacent weight members 58, 62, 64 mounted on the weight member locations 38, 42, 44, 46 could be connected to each other to secure the weight members at their weight member locations. Thus, the breadth and scope of the present disclosure should not be limited by any of the above described examples, but should be defined only in accordance with the following claims appended hereto and their equivalents.

The invention claimed is:

1. A tuned mass tool holder comprising:
a mass, a center of gravity, and a moment of inertia:
a holder body having an elongate length, an axis of rotation, a proximal end, and a distal end opposite the proximal end, wherein the mass has a mass distribution along the axis of rotation;
a spindle surface on the holder body adjacent the proximal end, of the holder body, wherein the spindle surface is configured for connection to a cutting machine spindle;
a weight member surface on the holder body adjacent the distal end of the holder body;
weight members removably attachable to the holder body at locations bounded by the weight member surface, wherein the weight members include through holes;
fasteners capable of being received in the through holes of the weight members, wherein the fasteners are operable to secure any one of the weight members to the holder body at any one of the locations;
at least two of the weight members are annular and have substantially equal exterior diameter dimensions; and
at least two of the weight members have different exterior diameters.

2. The tuned mass tool holder of claim 1, wherein:
the weight member surface has a plurality of weight member locations.

3. The tuned mass tool holder of claim 2, wherein:
each of the weight members is removably attachable to the weight member surface at each weight member location.

4. The tuned mass tool holder of claim 1, wherein:
each of the weight members is annular.

5. The tuned mass tool holder of claim 1, wherein:
each of the weight members is annular and has a mass and a moment of inertia; and
at least two weight members have at least one of different masses or different moments of inertia.

6. The tuned mass tool holder of claim 1 wherein:
each of the weight members is annular and has a mass and a moment of inertia; and
at least two weight members have at least one of equal masses or equal moments of inertia.

7. The tuned mass tool holder of claim 1, wherein:
at least two weight members are releasably attachable to each other.

8. The tuned mass tool holder of claim 1, wherein
the weight members have interior diameters that enable the weight members to be removably attached to the weight member surface.

9. The tuned mass tool holder of claim 1, wherein the mass of the tuned mass tool holder is adjustable.

10. The tuned mass tool holder of claim 9, wherein the mass distribution along the axis of rotation is adjustable.

11. The tuned mass tool holder of claim 1, wherein the center of gravity is configured to be moveable along the axis of rotation.

12. The tuned mass tool holder of claim 1, wherein the moment of inertia is adjustable.

13. A tuned mass tool holder comprising:
a mass, a center of gravity, and a moment of inertia;
a holder body having an elongate length, an axis of rotation, -a proximal end, and a distal end opposite the proximal end, wherein the mass has a mass distribution along the axis of rotation;
a spindle surface on the holder body adjacent the proximal end of the holder body, wherein the spindle surface is configured for connection to a cutting machine spindle;
a weight member surface on the older body adjacent the distal end of the holder body;
weight members removably attachable to the holder body at locations bounded by the weight member surface, wherein the weight members include through holes;
fasteners capable of being received in the through holes of the weight members, wherein the fasteners are operable to secure any one of the weight members to the holder body at any one of the locations;

the weight member surface on the holder body is a cylindrical exterior surface symmetrical to the axis of rotation;

each of the weight members has a cylindrical interior surface that is dimensioned to engage in sliding engagement around the cylindrical exterior surface; and at least two of the weight members having substantially equal exterior diameters; and, at least two of the weight members have different exterior diameters.

14. The tuned mass tool holder of claim 13, wherein:
the weight member surface has an axial length and an exterior diameter dimension that is substantially constant along the axial length.

15. The tuned mass tool holder of claim 13, wherein the weight members have substantially equal axial length dimensions.

16. The tuned mass tool holder of claim 13, wherein the mass is adjustable.

17. The tuned mass tool holder of claim 16, wherein the mass distribution along the axis of rotation is adjustable.

18. The tuned mass tool holder of claim 13, wherein the center of gravity is configured to be moveable along the axis of rotation.

19. The tuned mass tool holder of claim 13, wherein the moment of inertia is adjustable.

20. The tuned mass tool holder of claim 13, wherein at least two of the weight members are releasably attachable to each other.

* * * * *